(12) United States Patent
Dugatkin

(10) Patent No.: US 7,257,082 B2
(45) Date of Patent: Aug. 14, 2007

(54) SELF-SIMILAR TRAFFIC GENERATION

(75) Inventor: Diego Dugatkin, Thousand Oaks, CA (US)

(73) Assignee: IXIA, Calabasas, CA (US)

( * ) Notice: Subject to any disclaimer, the term of this patent is extended or adjusted under 35 U.S.C. 154(b) by 1039 days.

(21) Appl. No.: 10/404,864

(22) Filed: Mar. 31, 2003

(65) Prior Publication Data

US 2004/0190519 A1    Sep. 30, 2004

(51) Int. Cl.
*H04L 12/26* (2006.01)
(52) U.S. Cl. ................................. 370/235; 370/411
(58) Field of Classification Search ............... 370/229, 370/230, 235, 396, 398, 389, 395.21, 395.4, 370/395.42, 395.43, 428
See application file for complete search history.

(56) References Cited

U.S. PATENT DOCUMENTS

| | | | |
|---|---|---|---|
| 5,568,471 A | 10/1996 | Hershey et al. | |
| 5,671,351 A | 9/1997 | Wild | |
| 5,761,486 A | 6/1998 | Watanabe | |
| 5,787,147 A | 7/1998 | Gundersen | |
| 5,905,713 A | 5/1999 | Anderson et al. | |
| 6,028,847 A | 2/2000 | Beanland | |
| 6,148,277 A | 11/2000 | Asava | |
| 6,172,989 B1 | 1/2001 | Yanagihara et al. | |
| 6,173,333 B1 | 1/2001 | Jolitz | |
| 6,321,264 B1 | 11/2001 | Fletcher | |
| 6,343,078 B1 | 1/2002 | Bronstein et al. | |
| 6,507,923 B1 | 1/2003 | Wall et al. | |
| 6,526,259 B1* | 2/2003 | Ho | 455/67.11 |
| 6,580,707 B1 | 6/2003 | Ikeda | |
| 6,601,020 B1 | 7/2003 | Myers | |
| 6,621,805 B1 | 9/2003 | Kondylis et al. | |
| 6,789,100 B2 | 9/2004 | Nemirovsky | |
| 6,950,405 B2 | 9/2005 | Van Gerrevink | |
| 6,990,529 B2* | 1/2006 | Yang et al. | 709/235 |
| 7,002,918 B1* | 2/2006 | Prieto et al. | 370/252 |
| 7,161,902 B2* | 1/2007 | Carter et al. | 370/229 |
| 2001/0039590 A1 | 11/2001 | Furukawa | |
| 2002/0037008 A1 | 3/2002 | Tagami | |
| 2002/0080781 A1 | 6/2002 | Gustavsson | |
| 2002/0138226 A1 | 9/2002 | Doane | |

(Continued)

FOREIGN PATENT DOCUMENTS

EP    0895375    2/1999

OTHER PUBLICATIONS

Bramko, et al., Experiences with Network Simulation, ACM Sigmetrics International Conference on Measurement and Modeling of Computer Systems, Philadelphia, New York, May 23, 1996.

(Continued)

*Primary Examiner*—Brenda Pham
(74) *Attorney, Agent, or Firm*—SoCal IP Law Group LLP; Steven C. Serebolf

(57) ABSTRACT

There is disclosed apparatus and methods for mimicking self-similar traffic in a telecommunications network. One ore more self-similar streams of data units may be generated according to values of selected parameters for the streams, such as the Hurst parameter. Values may be pre-calculated and stored in a table in a memory. To generate the stream, a traffic distribution is generated based on the values of the parameters, and through retrieval of the values from the table.

129 Claims, 6 Drawing Sheets

U.S. PATENT DOCUMENTS

2002/0177977 A1   11/2002   Scarfat
2003/0043434 A1    3/2003   Brachmann et al.
2003/0099243 A1*  5/2003   Oh et al. ............... 370/395.21

OTHER PUBLICATIONS

Ixia, Specifications for Load Modules—Multilayer Gigbit Ethernet for LM1000LX, LM1000SX, LM1000GBIC, LM1000T, Product Specification Sheet.

Ulanvos, Modeling methods of self-similar traffic for network performance evaluation, Scientific Proceeding of RTU, Series 7, Telecommunications and Electronics, 2002.

Veres, et al., The Chaotic Behavior of TCP Congestion Control, Best Paper Award at IEEE INFOCOM, Tel-Aviv, Mar. 2000.

Zec, M. and Mikuc, M., Real-Time IP Network Simulation at Gigabit Data Rates, Proceedings of the 7th International Conference on Telecommunications (ConTEL), Jun. 2003.

Ye, Tao, et al., Large-Scale Network Parameter Configuration Using an On-line Simulation Framework, Technical report, ECSE Department, Rensselear Polytechnic Institute. 2002.

Kramer, Glen, Self-Similar Network Traffic: The notions and effects of self-similarity and long-range dependence, Online!, website: http://wwwcsif.cs.ucdavis.edu/{kramer/papers/ss_trf_present2.pdf>.

Mondragon, R.J. et al., Chaotic maps for traffic modelling and queueing performance analysis, Performance Evaluation 43, 2001.

Sikdar, Biplab and Kenneth S. Vastola, On the contribution of TCP to the Self-Similarity of Network Traffic, Springer-Verlag, p. 596-613, 2001, Berlin Germany ISBN: 3-450-42592-6. Sep. 20, 2001.

Ye, Tao, Network Management and Control Using collaborative On-Line Simulation, Rensselaer Polytechnic Institute, 2003.

Willinger, Walter, and Robert Sherman, Self-Similarity Through High-Variability: Statistical Analysis of Ethernet LAN Traffic at the Source Level, IEEE/ACM Transactions on Networking vol. 5 No. 1 Feb. 1997.

Ryu, "Fractal Network Traffic: From Understanding to Implications," Ph.D. Thesis, Columbia University, NY, 1996.

Guo et al, "How Does TCP Generate Pseudo-Self-Similarity?," In Proceedings of the International Workshop on Modeling, Analysis and Simulation of Computer and Telecommunications Systems—MASCOTS '01, Cincinnati, Ohio, Aug. 2001.

Veres et al, "The Chaotic Behavior of TCP Congestion Control," Best Paper Award at Proceedings of IEEE INFOCOM (and Best paper Award), Tel-Aviv, Mar. 2000.

Paxson, "Fast Approximate Synthesis of Fractional Gaussian Noise for Generating Self-Similar Network Traffic," Computer Communication Review 27(5), pp. 5-18, Oct. 1997.

Wallerich, "Self-Similarity and Heavy Tailed Distributions," Design and Implementation of a WWW Workload Generator for the NS-2 Network Simulator (Chapter 2.2), NSWEB.

Kramer, et al, Interleaved Polling with Adaptive Cycle Time (IPACT): Protocol Design and Performance Analysis, Jul. 2001.

Kramer, "On Generating Self-Similar Network Traffic Using Pseudo-Pareto Distribution," Tutorial, U.C. Davis.

Kramer, "Generator of Self-Similar Network Traffic (version 2)," U.C. Davis.

Delgado-Restituo et al, "Integrated Chaos Generators," Proceedings of the IEEE, vol. 90, No. 5, May 2002.

Kramer, "Generator of Self-Similar Network Traffic," U.C. Davis.

Taqqu, et al, "Proof of a Fundamental Result in Self-Similar Traffic Modeling".

Willinger, et al., "Self-Similarity and Heavy Tails: Structural Modeling of Network Traffic".

Willinger, et al., "Self-Similarity Through High-Variability: Statistical Analysis of Ethernet LAN Traffic at the Source Level," Proc. of the ACM/Sigcomm '95.

* cited by examiner

SELF-SIMILAR TRAFFIC GENERATION

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to traffic generation for network analysis and network testing.

2. Description of Related Art

Multiple recent studies of high-speed Ethernet, ATM, Local-Area Networks (LAN), Wide-Area Networks (WAN), Storage Area Networks (SAN) I/O traffic, signaling, WWW, multimedia and video traffic have demonstrated that the variability in typical network traffic involves non-negligible correlations across several time-scales. These evaluations challenge traditional data traffic modeling, traditionally based on the Poisson process and other Short-Range Dependent (SRD) processes.

One of the most striking features of packet-switched network traffic is its tremendous burstiness, persistent at practically any time scale. Such Long-Range Dependence (LRD) manifests itself through a self-similar or fractal-like behavior. "Self-similarity" means that a segment of traffic measured at one time scale resembles an appropriately scaled version of the traffic at a different time scale.

Many networking studies have considered self-similarity, both for analysis and synthesis of the fractal characteristics of network traffic. The communications industry (e.g., AT&T, Nortel, Ericsson) has been supportive of research groups in this area, and more recently some companies have started developing self-similar traffic generators to measure and test networking equipment, as well as properly scale it during system design.

Fractal phenomena are common in both natural and human-made scenarios, including natural landscapes, ocean waves, earthquake distributions, stock market behavior, and packet-network traffic. As used herein, fractal and self-similar behavior are considered synonyms.

It has been proven that heavy tails in flow sizes (or lengths) are able to generate self-similarity. Heavy-tail distributions are those whose tails decay with a power law (which is a much slower decay than exponential), indicating non-negligible probability even for extremely large observations. They describe long-memory processes with robust time dependence configurations that vanish very slowly. The "heavy-tailedness" of a random variable puts in evidence the combination of numerous small observations mixed with a few large observations, where most of the contributions to the sample mean and variance of the dataset comes from the few large observations.

Important work in this field has been done by Leland, Taqqu, Willinger and Wilson. See, for example, W. E. Leland, M. S. Taqqu, W. Willinger, and D. V. Wilson, "A Bibliographical Guide to Self-Similar Traffic and Performance Modeling for Modern High-Speed Networks," in Stochastic Networks, F. P. Kelly, S. Zachary, and I. Zieldins (eds.), Oxford University Press, pp. 339-366, 1996; and W. E. Leland, M. S. Taqqu, W. Willinger, and D. V. Wilson, "On the self-similar nature of Ethernet traffic," IEEE/ACM Transactions on Networking, vol. 2, pp. 1-14, February 1994. Other important work in the field has been done See for, example, B. K. Ryu, "Fractal Network Traffic: From Understanding to ions," Ph.D. Thesis, Columbia University, NY, 1996.

DETAILED DESCRIPTION OF THE INVENTION

Throughout this description, the embodiments and examples shown should be considered as exemplars, rather than limitations on the apparatus and methods of the present invention.

The superposition of multiple ON/OFF sources (also known as "packet trains") with high variability and infinite variance results in an aggregate self-similar sequence (network traffic). Therefore producing and aggregating ON/OFF sources with heavy-tailed disributions is a feasible approach for self-similar traffic generation. The invention, in one respect, uses the ability of aggregated heavy-tailed distributions to generate self-similar sequences. According to one aspect of the invention, a traffic distribution is set to be heavy tailed in the ON periods, the OFF periods, or both.

Figure 5:
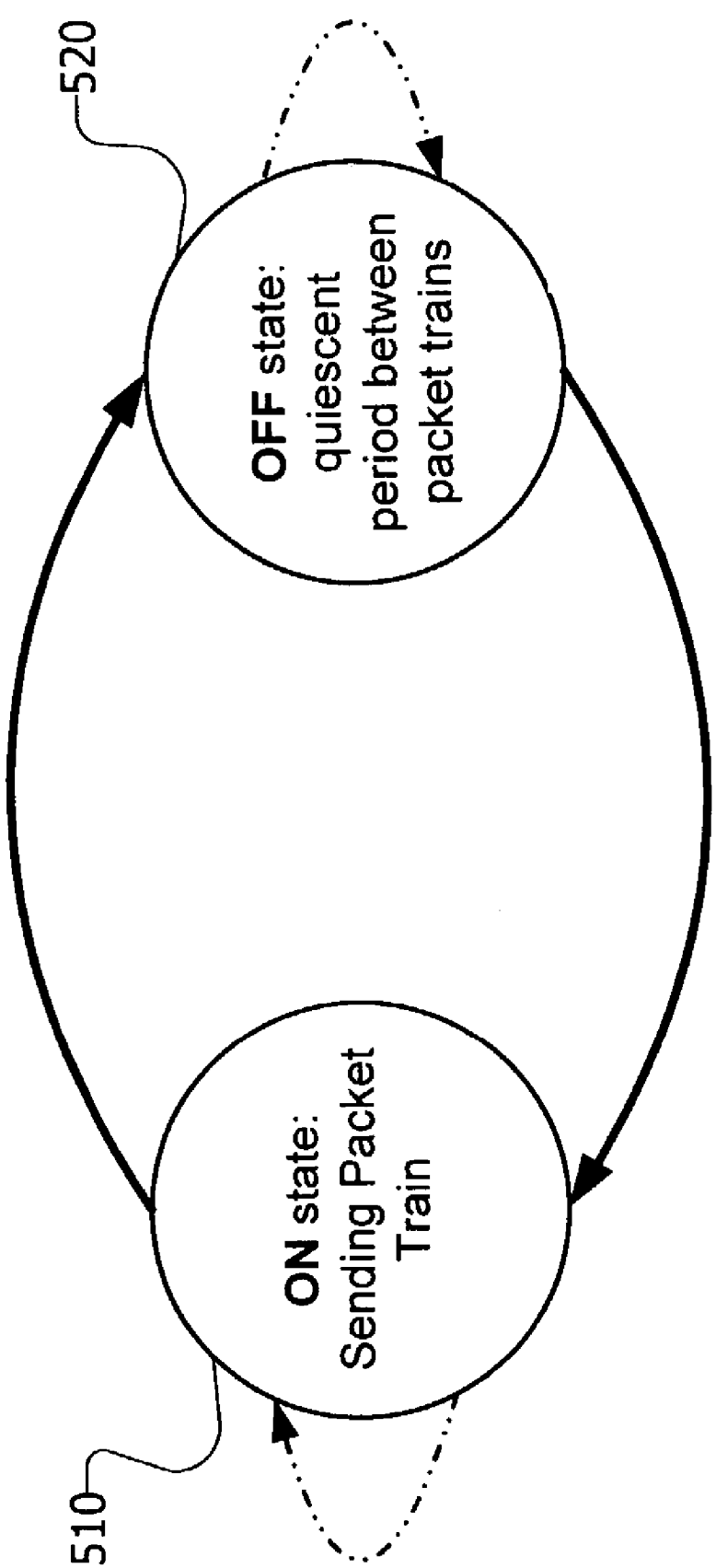
FIG. 5 is a state machine modeling a TCP flow in accordance with the invention.
Figure 6:
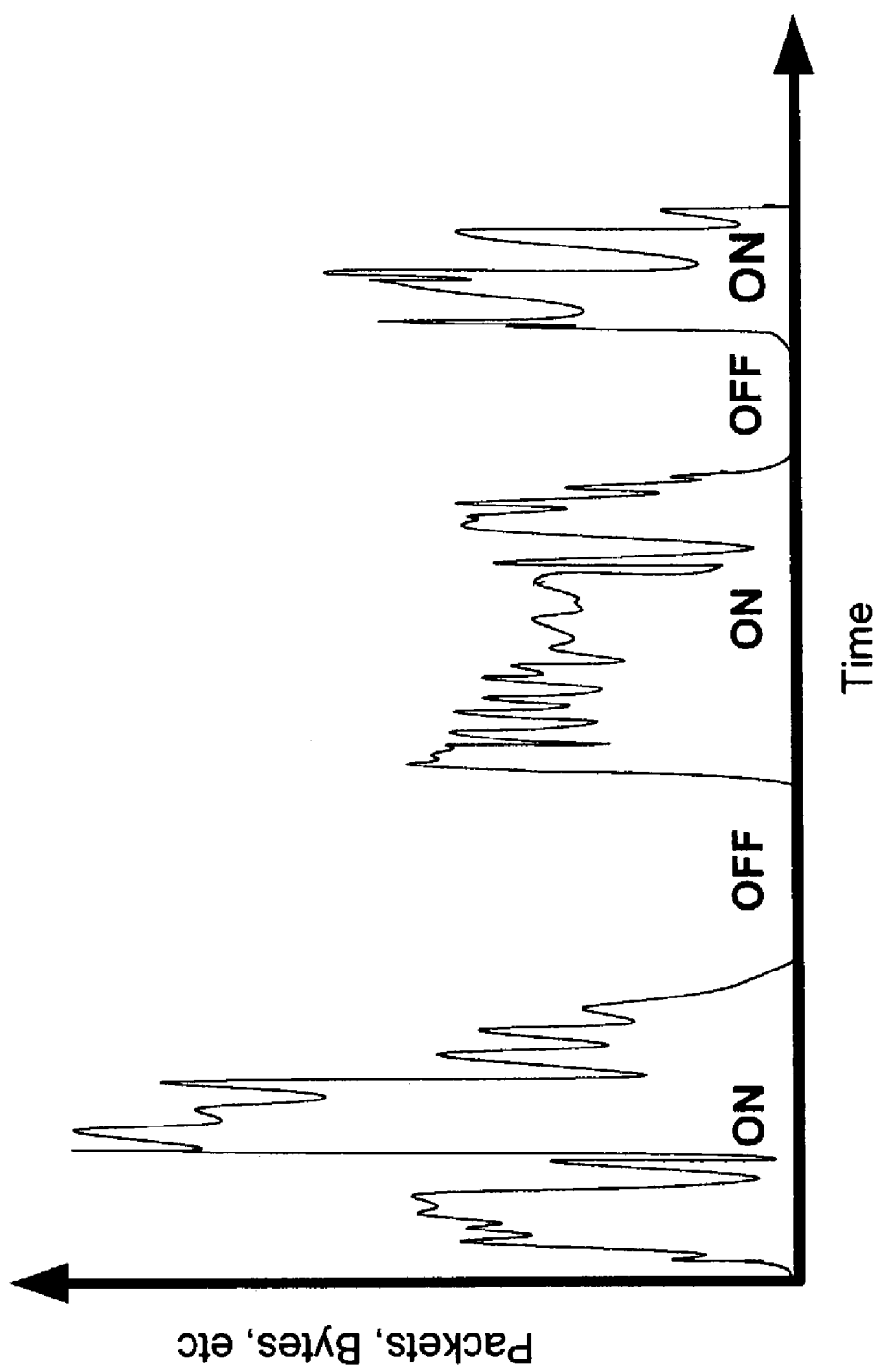
FIG. 6 is a graph of ON/OFF properties of a sample of TCP traffic.

Multiplexing several independent and identically distributed (i.i.d.) heavy-tailed ON/OFF sources can generate self-similar traffic. Each ON state corresponds to the period when a packet train is being transmitted, and each OFF state corresponds to the quiescent period between packet trains. Referring now to FIG. 5, there is shown a simple state machine describing this basic structure. In state 510, a packet train is sent. In state 520, there is a quiescent period between trains. FIG. 6 shows a schematic traffic plot, with sequences of ON periods when data is being sent, followed by OFF periods of silence in between them.

ON/OFF heavy tailed distributions for traffic generation may be applied in different ways. According to one aspect of the invention, a sequence of natural numbers is generated that is self-similar, where the meaning of those integers is irrelevant from the generation point of view. The integers may correspond to the number of packets, to the number of bytes per unit time (or specified time-bin), or to anything else. The use of the self-similar sequence is to be determined a posteriori.

There is abundant literature on several possible approaches to generating self-similar sequences. Herein, aspects related to some of them are discussed. One approach employs the aggregation of competing TCP flows in the same channel. A second approach uses the aggregation of several Pareto-distributed pseudo-random number generators into one multiplexed output. A third approach uses truncated Pareto distributions. Each one or a combination may be utilized to produce self-similar sequences.

Competing TCP Flows: Controlling Chaos

Since TCP flows can be modeled as ON/OFF sources with heavy-tail distribution, competing TCP flows can be used to generate the desired scaling structure of the traffic. By aggregating a collection of competing TCP flows in the same channel, the chaotic mechanisms of TCP can generate scaling behavior on large timescales.

TCP's congestion window size is one of the multiple aspects that characterize the dynamics of competing "greedy" TCP flows on the same link. Depending on a few parameters, such as link rate, buffer size, and delay, the individual behavior of the flows is modified as well as the aggregated performance.

By artificially increasing congestion in the link or escalating the drop rate, the time-out mechanisms kick-in, increasing the silent periods between packet trains, hence the OFF-periods become even more heavy-tailed. The heaviest of the tails is the one that dominates how self-similar the resulting sequence will be, therefore by sufficiently increasing the OFF-periods the degree of self-similarity H can be controlled. Notice that not all configurations of link rates, buffer sizes, and delays generate self-similar time-series, and in some cases they experience high sensitivity to initial conditions. It has been reported that the ratio buffer size/delay seems to be what most directly controls the performance of the system. Larger loss rates tend to create longer-timescale dependence in the generated traffic. Furthermore, it has been verified that indeed "real" TCP microflows exhibit long-range dependence when measured in real packet networks, as TCP connections over the Internet.

Artificially increasing congestion in the link may produce self-similar TCP traffic per-se. However, by exploiting the properties of the TCP end-to-end flow-control and congestion-avoidance mechanisms, a self-similar sequence may also be created. Such a sequence of values is simply the count of packets (or bytes, etc.) that "went through" the link.

To generate specific types of TCP or other kinds of traffic, a traffic distribution may be used to modulate a stream. The minimum number of competing TCP flows needed to generate fractal behavior may be implemented using two full TCP stacks talking to each other, under certain loss-rate and other conditions. A pair of TCP stacks may be used to create one self-similar sequence.

References relied upon for this discussion included: L. Guo, M. Crovella, I. Matta "How does TCP generate Pseudo-self-similarity?," in Proceedings of the International Workshop on Modeling, Analysis and Simulation of Computer and Telecommunications Systems—MASCOTS '01, Cincinnati, Ohio, August 2001; Veres and Boda, "The Chaotic Behavior of TCP Congestion Control," Proceedings of IEEE INFOCOM, Tel-Aviv, March 2000; B. Sikdar and K. S. Vastola, "On the Contribution of TCP to the Self-Similarity of Network Traffic," lecture notes in computer science, Proceedings of IWDC, vol. 2170, pp. 596-613, 2001; and B. Sikdar and K. S. Vastola, "The Effect of TCP on the Self-Similarity of Network Traffic," Proceeding of 35th Conference on Information Sciences and Systems, Baltimore, Md., March 2001.

Pareto Aggregation

In the Pareto aggregation approach, multiplexing several independent and identically distributed (i.i.d.) heavy-tailed ON/OFF sources can generate self-similar traffic.

The simplest heavy-tailed distribution is the Pareto distribution, which for a random variable X has a probability mass function (pmf)

$$p(x) = ab^\alpha x^{-\alpha-1} = \frac{ab^\alpha}{x^{\alpha+1}},$$

with a,b>0 and x>b, where a is the shape parameter or tail index and b is the minimum possible value of X. The corresponding cumulative distribution function (cdf) is $$F(x) = P[X \le x] = 1 - \left(\frac{b}{x}\right)^\alpha.$$

A collection of ON/OFF Pareto engines may be used, each based on an independent Pseudo-Random Number Generator (PRNG). Every Pareto-distributed sequence can be implemented as $$X_{Pareto} = \frac{b}{U^{1/\alpha}}; 0 < U \le 1$$

$$\log_2 X_{Pareto} = \log_2 b - \frac{1}{\alpha}\log_2 U$$

$$X_{Pareto} = 2^{\log_2 b - \frac{1}{\alpha}\log_2 U}$$

where U is a uniformly distributed random variable.

For self-similar traffic $1 \le \alpha \le 2$, where the lower the value of $\alpha$, the higher the probability of very large values of X. Notice that for $\alpha \le 2$, then X has an infinite variance, and for $\alpha \le 1$, then X has an infinite mean.

The relationship between the shape parameter $\alpha$ and the degree of self-similarity, given by the Hurst parameter H, is $$H = \frac{3-\alpha}{2}.$$

References relied upon for this discussion included: W. Willinger, M. S. Taqqu, R. Sherman, and D. Wilson, "Self-Similarity Through High-Variability: Statistical Analysis of Ethernet LAN Traffic at the Source Level," proceedings of the ACM SIGCOMM '95, pp 100-113, Cambridge Mass., August 1995; W. Willinger, M. S. Taqqu, R. Sherman, and D. Wilson, "Self-Similarity Through High-Variability: Statistical Analysis of Ethernet LAN Traffic at the Source Level," IEEE/ACM Trans on Networking 5:71-86, 1997; L. G. Samuel, J. M. Pitts, R. J. Mondragón, "Fast Self-Similar Traffic Generation," Proceedings of the Fourteenth UK Teletraffic Symposium on Performance Engineering in Information Systems, Manchester UK, March 1997, pp 8/1-8/4; G. Kramer, B. Mukherjee, and G. Pesavento, "Interleaved Polling with Adaptive Cycle Time (IPACT): A Dynamic Bandwidth Distribution Scheme in an Optical Access Network," Photonic Network Communications, Volume 4 (1), January 2002. Pages 89-107; M. E. Crovella and L. Lipsky, "Long-Lasting Transient Conditions in Simulations with Heavy-Tailed Workloads," Proceedings of the 1997 Winter Simulation Conference (WSC-97), December 1997; and J. Wallerich, "Self-Similarity and Heavy Tailed Distributions, Design and Implementation of a WWW Workload Generator for the NS-2 Network Simulator" (Chapter 2.2), NSWEB.

Truncated-Value Pareto Distributions

In accordance with one aspect of the invention, truncated-value Pareto distributions may be generated by selecting a minimum length of the OFF period for every Pareto ON/OFF source i. This may be achieved by assuming a given packet size k, a given load $L_i$ for each source, and the shape parameters (a.k.a. tail indices) $\alpha_{ON}$ and $\alpha_{OFF}$ for the ON-period and OFF-period respectively. Note that the minimum length of the ON period is one packet, $M_{ON}=1$. The duration of the minimum length for the OFF period for source i is $$M_{OFF} = k \times \frac{T_{OFF}}{T_{ON}} \times \frac{1-S^{T_{ON}}}{1-S^{T_{OFF}}} \times \left(\frac{1}{L_i} - 1\right),$$

denoting $$T_{ON} = \frac{\alpha_{ON} - 1}{\alpha_{ON}} \text{ and } T_{OFF} = \frac{\alpha_{OFF} - 1}{\alpha_{OFF}},$$

and where S is the smallest non-zero value that the uniform PRNG can produce.

When using a finite precision system, e.g., a computer, to generate a pseudo-Pareto distribution with the above $M_{OFF}$ minimum OFF-time there will be a higher density of points toward the lower-end of the scale. Regardless of the window size, toward the tail end of the distribution there will always be a region where the distance between two points with non-zero probability exceeds an arbitrarily chosen window size. The undesired consequence is that some windows will contain no samples, even when the total number of samples asymptotically tends to infinity. This introduces error in the mean size of the ON and OFF periods is due to the discrete nature of the implementation versus the continuous nature of the theoretical Pareto distribution. A heuristic solution, using a correction coefficient C, leads to $$M_{OFF} = k \times \frac{C_{ON}}{C_{OFF}} \times \frac{T_{OFF}}{T_{ON}} \times \frac{1-S^{T_{ON}}}{1-S^{T_{OFF}}} \times \left(\frac{1}{L_i} - 1\right).$$

The lengths of the ON and OFF periods may be regulated by adjusting the $\alpha_{ON}$ and $\alpha_{OFF}$ parameters. Arguably, $\alpha_{ON} > \alpha_{OFF}$ for real traffic, since usually the probability of a very large OFF period is higher than the probability of an equally large ON period.

Given $C=(1.19 \cdot \alpha - 1.166)^{-0.027}$ as a heuristic correction coefficient, and if $\alpha_{ON}=\alpha_{OFF}$ is chosen, then the expression for $M_{OFF}$ appreciably reduces to $$M_{OFF} = k \times \left(\frac{1}{L_i} - 1\right).$$

Since $(1/\alpha)$ and $(\log_2 b)$ are constant, then the only calculation of table look-up operation needed is for $(\log_2 U)$.

References relied upon for this discussion included: G. Kramer, "On Generating Self-Similar Traffic Using Pseudo-Pareto Distribution," Tutorial, U. C. Davis.

The implementation of the exponentials (of base-2), to execute $2^{1/\alpha \log_2 U}$ as part of the calculation of the $X_{Pareto}$, is quite simple for integer exponents. The same simple method may be used for floating point exponents with minor modifications. Choosing base-2 makes the calculation of $2^j$ to be simply a "set-to-1" operation of the (binary) bit placed at the $j^{th}$ (in order of increasing significance, starting with j=0 on the right-hand-side).

This approach may be applied for floating point exponents by including the point in the binary representation of the exponent and adjusting the bit to be set to one accordingly, for example.

Pseudo random numbers may be first generated with a uniformly distributed PRNG, and then shaped as Pareto using the above equations, implemented in a table. Having a resolution in the table below the number of potentially different number of inputs to the table (the Uniform values) would mean that some end up getting mapped to the same output value. Therefore, it is necessary to have a resolution given by the self-similar maximum length, and the desired granularity.

It is not strictly necessary to generate heavy-tailed distributions for both the ON and the OFF periods. Generating one heavy tail distribution may be adequate, and the other one can have another distribution. For example, a random time (between some boundaries) may be used for one type of period (ON or OFF), and the other may be Pareto-distributed.

Description of the System

Figure 1:
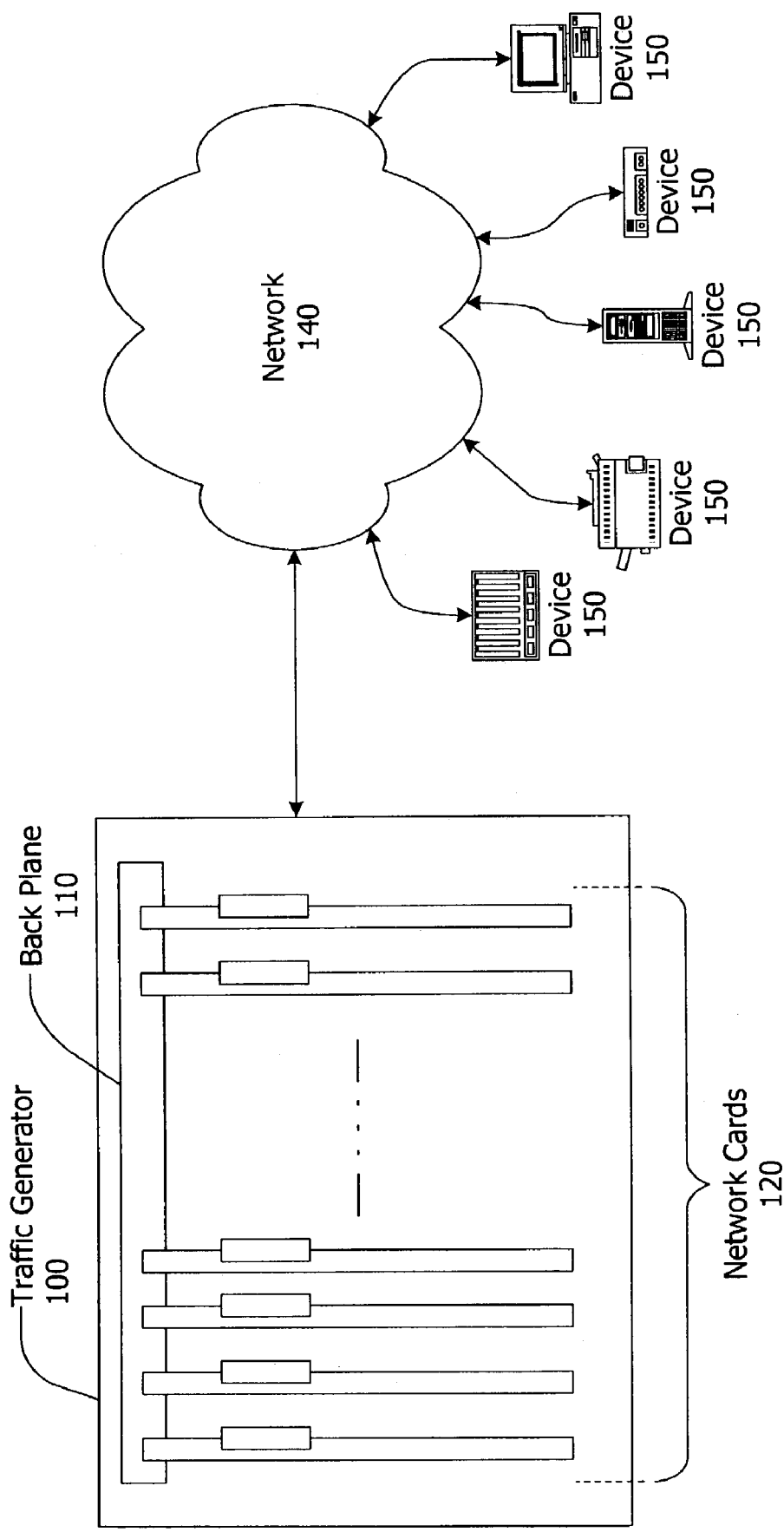
FIG. 1 is a block diagram of an environment in accordance with the invention.

Referring now to FIG. 1, there is shown a block diagram of an environment in accordance with the invention. The environment includes a traffic generator 100, a network 140 and plural network devices 150.

The traffic generator 100 may be a network testing device, performance analyzer, conformance validation system, network analyzer, network management system, or programmed general purpose computer (e.g., a PC). The traffic generator 100 may include one or more network cards 120 and a back plane 110. Traffic generator 100 may be in the form of a card rack, as shown in FIG. 1, or may be an integrated unit. Alternatively, the traffic generator may comprise a number of separate units cooperative to provide traffic generation. The traffic generator 100 and the network cards 120 may support one or more well known standards or protocols such as the 10 Gigabit Ethernet and Fibre Channel standards, and may support proprietary protocols as well.

The network cards 120 may include one or more field programmable gate arrays (FPGA), application specific integrated circuits (ASIC), programmable logic devices (PLD), programmable logic arrays (PLA), processors and other kinds of devices. In addition, the network cards 120 may include software and firmware. The term network card encompasses line cards, test cards, analysis cards, network line cards, load modules, interface cards, network interface cards, data interface cards, packet engine cards, service cards, smart cards, switch cards, relay access cards, and the like. Each network card 120 may provide one or more network ports. The ports of the network cards 120 may be connected to the network through wire, optical fiber, wirelessly or otherwise. Each network card 120 may support a single communications protocol, may support a number of related protocols, or may support a number of unrelated protocols. The network cards 120 may be permanently installed in the traffic generator 100 or field removable. Each network card 120 may provide one or more ports.

The back plane 110 may serve as a bus or communications medium for the network cards 120. The back plane 110 may also provide power to the network cards 120.

The network devices 150 may be any devices capable of communicating over the network 140. The network devices 150 may be computing devices such as workstations, personal computers, servers, portable computers, personal digital assistants (PDAs), computing tablets, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, and multiplexers. In addition, the network devices 150 may include appliances such as refrigerators, washing machines, and the like as well as residential or commercial HVAC systems, alarm systems, and any other device or system capable of communicating over a network.

The network 140 may be a LAN, a WAN, a SAN, wired, wireless, or a combination of these, and may include or be the Internet. Communications on the network 140 may take various forms, including frames, cells, datagrams, packets or other units of information, all of which are referred to herein as data units. The traffic generator 100 and the network devices 150 may communicate simultaneously with one another, and there may be plural logical communications between the traffic generator 100 and a given network device 150. The network itself may be comprised of numerous nodes providing numerous physical and logical paths for data to travel.

A flow of data units originating from a single source on the network having a specific type of data unit and a specific rate will be referred to herein as a "stream." A source may support multiple outgoing and incoming streams simultaneously and concurrently, for example to accommodate multiple data unit types or rates. A source may be, for example, a port on a network interface. "Simultaneously" means "at exactly the same time." "Concurrently" means "within the same time." A single stream may represent one or more concurrent "sessions." A "session" is a lasting connection between a fixed, single source, and a fixed, single destination comprising a sequence of one or more data units. The sessions within a stream share the data rate of the stream through interleaving. The interleaving may be balanced, unbalanced, and distributed among the represented sessions. Two or more sessions represented by the same stream may transmit data units from a source concurrently, but not simultaneously.

Although a session carries data units between two fixed end points, the session may include multiple paths within the network 140. Within the network 140, sessions may be broken apart and reconstituted to allow for greater data rates, better error control, better network utilization, lower costs or otherwise. The sessions may include one or more intermediary paths, channels, or routes between one or more intermediary devices. The multiple intermediary paths, channels or routes may be aligned in parallel and/or serially with respect to one another within the network 140.

Figure 2:
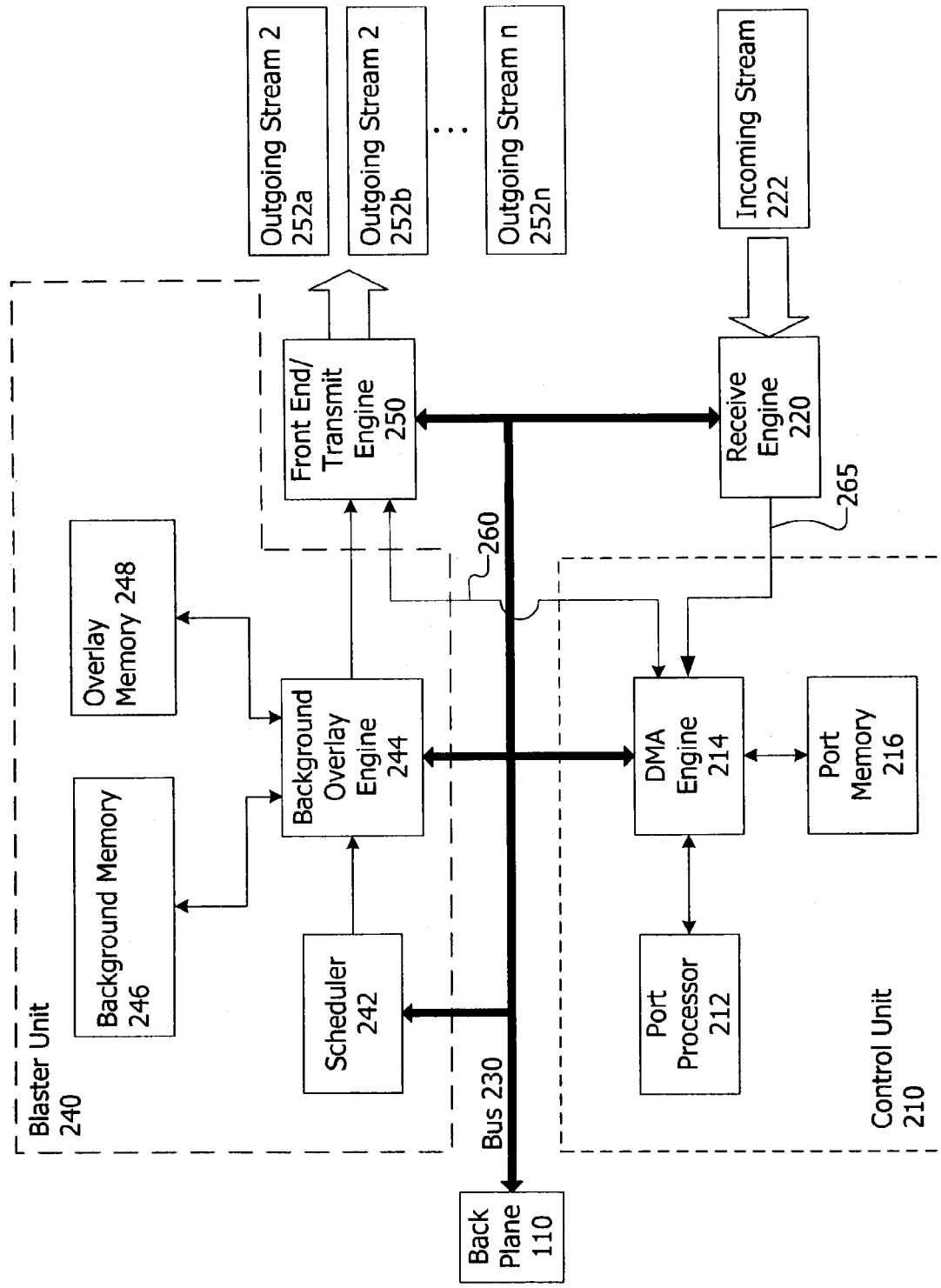
FIG. 2 is a block diagram of an apparatus according to one aspect of the invention.

Referring now to FIG. 2, there is shown a block diagram of an apparatus according to one aspect of the invention. The apparatus may be the traffic generator 100 (FIG. 1), the network card 120 (FIG. 1), or one or more components of the traffic generator 100 (FIG. 1) or the network card 120 (FIG. 1), such as a port. The apparatus includes a control unit 210, a blaster unit 240, a receive engine 220, a front end/transmit engine 250, a bus 230 and communication paths 260, 265.

The bus 230 provides a communications path between the control unit 210, the receive engine 220, the blaster unit 240, the front end/transmit engine 250 and the back plane 110. The bus 230 may be used for communicating control and status information, and also data. Communication paths 260, 265 may be used for communicating data, and also control and status information.

The control unit 210 includes a port processor 212, a DMA engine 214, and a port memory 216. The control unit 210 may provide PRNG.

The port processor 212 may be a microprocessor or other programmable processor. From outside the apparatus, the port processor 212 receives control instructions such as patterns of traffic which the apparatus is to generate. The control instructions may be received from a network device over an incoming stream 222. Alternatively, the control instructions may be provided directly to the apparatus via the bus 230, for example via the back plane 110. The port processor 212 may have an application program interface (API) for external control of the apparatus. A user may use a software program on a host to enter commands which create the control instructions that are sent to the port processor 212. The control unit 210 may store the control instructions in port memory 216 before, after, and during their execution.

The DMA engine 214 comprises an interface and control logic providing demand memory access. The DMA engine 214 is coupled to the port processor 212, the port memory 216, the receive engine 220 and the bus 230. In response to requests from the port processor 212, the DMA engine 214 fetches data units and data from the port memory 216. The DMA engine 214 also provides a path from the port processor 212 to the blaster unit 240 and the front end/transmit engine 250.

The receive engine 220 receives incoming data streams, such as stream 222. The incoming stream 222. The receive engine 220 may process incoming data units according to a filter provided by or controlled by the port processor 212. After receiving the incoming data units, the receive engine 220 passes the data units to the DMA engine 214, which may store the data units in the port memory 216 or pass them directly to the port processor 212. The receive engine may communicate with the DMA engine 214 via bus 230 and/or communication line 265. Incoming data units may also be discarded, for example by either the receive engine 220 (e.g., filtered out) or the DMA engine 214. Incoming data units may include control data from a network device, e.g., for negotiating, setting up, tearing down or controlling a session. Incoming data units may also include data from a network device.

The front end/transmit engine 250 transmits outgoing data units as one or more streams 252a, 252b, . . . 252n. The data units, which the front end/transmit engine 250 transmits, may originate from the control unit 210 or the blaster unit 240. The control unit 210 originates control data for negotiating, setting up, tearing down and controlling streams and sessions. The front end/transmit engine 250 is coupled to the bus 230 and communications line 265 for receiving control information and data units.

The blaster unit 240 includes a scheduler 242, a background overlay engine 244, a background memory 246, an overlay memory 248, and a front end/transmit engine 250. The scheduler 242, the background overlay engine 244 and the background memory 246 cooperate to form data units and to pass these data units to the front end/transmit engine 250.

The blaster unit 240 uses session configuration information, comprising instructions for forming and timing transmission of the outgoing data units. The blaster unit 240 may receive the session configuration information from the port processor 212. The components of the session configuration information may be communicated as a unit or separately.

At least some of the session configuration information—templates and overlays—may be stored in the two memories 246, 248 of the blaster unit 240. The background memory 246 stores a template for the data units of each outgoing stream 252. The overlay memory 248 stores an overlay for each outgoing session 254. Whereas the template provides a basic layout of what will be an outgoing data unit, the overlay memory 248 dictates how the template will be modified or completed to produce the data units of the session. Although the overlay memory 248 and the background memory 246 are shown as separate units, they may be combined into a single memory. Likewise, the port memory 216 may be combined with one or both of the background memory 246 and the overlay memory 248.

The scheduler 242 manages a schedule of transmission times for each of the outgoing streams, such as streams 252a, 252b, 252n. The scheduler 242 operates like a metronome or clock to ensure that the outgoing streams conform to their respective data rates. Once configured and enabled for a given stream, the scheduler 242 sends a next transmit signal to the background overlay engine 244 when a data unit for the corresponding stream is to be transmitted. Alternatively, the scheduler 242 may signal to the background overlay engine 244 when the background overlay engine 244 should form an outgoing data unit, and the background overlay engine 244 implicitly passes the formed data units to the front end/transmit engine 250 for transmission. The scheduler 242 is connected to the bus 230 is coupled to the bus 230 for receiving control information.

The background overlay engine 244 forms outgoing data units. The background overlay engine 244 is coupled to the scheduler 242, the background memory 246, the overlay memory 248 and the front end/transmit engine 250. The background overlay engine 244 uses the templates in the background memory 246 and overlays in the overlay memory 248, combining them to form outgoing data units. When signaled by the scheduler 242, the background overlay engine 244 passes a formed outgoing data unit for a session of the signaled stream to the front end/transmit unit 250.

Figure 3:
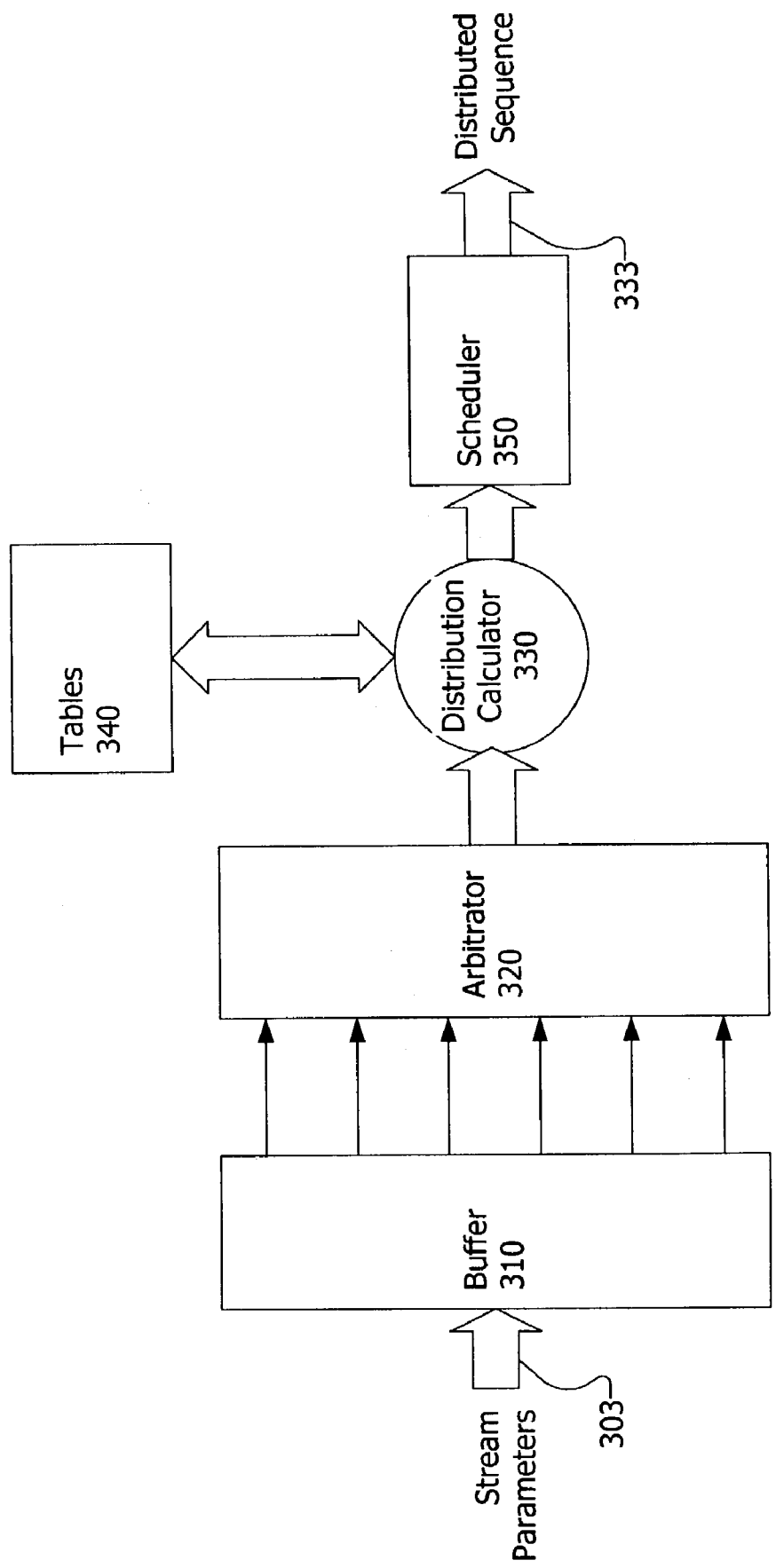
FIG. 3 is a functional block diagram in accordance with the invention.

Referring now to FIG. 3, there is shown a functional block diagram in accordance with the invention. The diagram includes a buffer 310, an arbitrator 320, tables 340, a distribution calculator 330 and a scheduler 350.

The buffer 310 may comprise plural shift registers, a memory, or other device. The buffer 310 receives self-similarity parameters for the streams to be generated. These parameters may include the Hurst parameter, and may correspond to the ON or OFF period for the corresponding stream.

The arbitrator 320 comprises logic for selecting at least one of the streams to service next. The number of streams which may be selected may be dependent on the processing and/or logic capabilities of the arbitrator 320 and other components.

The tables 340 store distributed sequences for self-similar traffic. The tables 340 may be stored in a memory. These distributed sequences may correlate to a range of values for the Hurst parameter.

The distribution calculator 330 comprises logic for generating a self-similar traffic distribution for the selected stream based on the self similarity parameters for the selected stream. The distribution calculator 330 retrieves a distributed sequence (or other values as described herein) from the tables 340 based upon the self-similarity parameters for the selected stream. The distribution calculator 330 produces the traffic distribution for the stream according to a formula which uses the retrieved distributed sequence.

According to one aspect of the invention, the self-similar traffic distribution is based upon distributed sequences described by a formula having a shape parameter, a minimum value for the respective distributed sequence and a uniformly distributed random variable. The shape parameter has a fixed value. The minimum value for the distributed sequences is fixed. The tables 340 store logarithms of values of the uniformly distributed random variable.

The scheduler 350 may be the scheduler 242 (FIG. 2). The scheduler 350 may allocate rate for each packet within a train, without overflowing packets to any later ON (or OFF) periods. The scheduler 350 may incorporate some notion of duration of the packets.

Description Of The Methods

Figure 4:
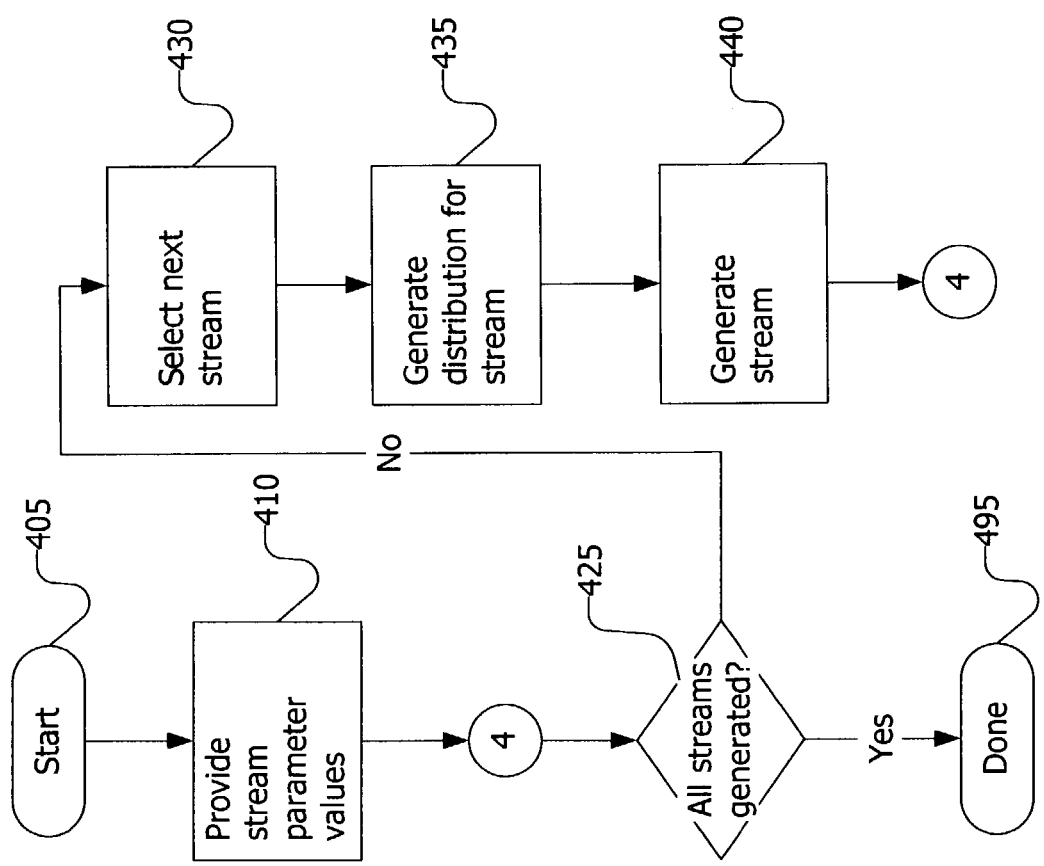
FIG. 4 is a flow chart of a method in accordance with another aspect of the invention.

Referring now to FIG. 4, there is shown a flow chart of a method in accordance with other aspect of the invention. As a preliminary matter, it may be desirable or necessary to select a particular formula for generating the self-similar traffic distributions. Furthermore, it may be desirable or necessary to pre-calculate distributed sequences or other values for storage in the tables or memory. Finally, it may be desirable or necessary to store the pre-calculated distributed sequences or other values for storage in the tables or memory. The tables or memory may store distributed sequences for self-similar traffic correlated to a range of values for the Hurst parameter and/or other parameters. The stored values may be logarithms of values of a uniformly distributed random integer.

These steps may be performed at the start of the method (step 405), although they may also be performed subsequent to the start (step 405). Thus, the formula and pre-calculations may be dynamically changed during the course of traffic generation. In this way, different patterns or degrees of self-similarity may be obtained.

In performing the method, one step is to provide values for at least one self-similarity parameter for the streams (step 410). The self-similarity parameters may include the Hurst parameter, an average arrival time and a fractal onset time.

If all streams are generated, (step 425), then no further processing is necessary (step 495).

In another step, a next stream is selected (step 430). More than one stream may be selected, for example for processing in a pipelined or parallel manner.

Next, a distribution is generated for the selected streams (step 435). The self-similar traffic distributions may be based upon distributed sequences retrieved from memory or the tables 340 (FIG. 3). The value of the Hurst parameter for the respective streams may alone be used to retrieve the distributions. The values of the average arrival time, the fractal onset time, and or other parameters may be used for retrieving the distributed sequences from the table 340 (FIG. 3), in conjunction with the Hurst parameter. The retrieved values may be the pre-calculated logarithms.

As described above, the distributed sequences may be described by many different approaches. For example, the distributed sequences may comprise superposition of plural independent and probabilistically identical fractal renewal processes. The distributed sequences may be described by a formula having a shape parameter and a minimum value for the respective distributed sequence and a uniformly distributed random variable. The value for the shape parameter may be fixed and the minimum value for the distributed sequences may be fixed. If so, then the tables 340 (FIG. 3) may comprise logarithms of values of the uniformly distributed random variable.

After the distribution is generated for the selected streams, the selected streams may be generated (step 440). Steps 430, 435 and 440 repeat until all the streams have been generated (step 425), unless of course the process is interrupted. The generated streams of self-similar traffic may then be applied to a portion of a telecommunications network. The generated streams may also be used to simulate a behavior of a portion of the telecommunications network.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

The invention claimed is:

1. A method for mimicking self-similar traffic in a telecommunications network, the method comprising
providing a table of distributed sequences for self-similar traffic
providing values for at least one self-similarity parameter for plural streams, the self-similarity parameters including a Hurst parameter
selecting at least one of the streams
generating a self-similar traffic distribution for the selected streams based on the values of the self similarity parameters for the selected streams
wherein the self-similar traffic distribution is further based upon distributed sequences retrieved from the table based upon the value of the Hurst parameter for the selected streams
wherein the distributed sequences are described by a formula having a shape parameter and a minimum value for the respective distributed sequence and a uniformly distributed random variable
wherein the value for the shape parameter is fixed and the minimum value for the distributed sequences is fixed
wherein the table comprises logarithms of values of the uniformly distributed random variable.

2. The method for mimicking self-similar traffic in a telecommunications network of claim 1, wherein the distributed sequences are Pareto-distributed sequences.

3. The method for mimicking self-similar traffic in a telecommunications network of claim 1, wherein the distributed sequences are truncated-value Pareto distributions.

4. The method for mimicking self-similar traffic in a telecommunications network of claim 1, wherein the distributed sequences comprise competing flows.

5. The method for mimicking self-similar traffic in a telecommunications network of claim 4 wherein the distributed sequences each comprise a single ON/OFF process.

6. The method for mimicking self-similar traffic in a telecommunications network of claim 1, wherein the traffic distribution comprises a series of ON and OFF periods.

7. The method for mimicking self-similar traffic in a telecommunications network of claim 6, wherein only one of the ON and OFF periods has a heavy-tailed distribution.

8. The method for mimicking self-similar traffic in a telecommunications network of claim 7, wherein the heavy-tailed distribution is a Pareto distribution.

9. The method for mimicking self-similar traffic in a telecommunications network of claim 1 wherein the distributed sequences comprise superposition of plural independent and probabilistically identical fractal renewal processes.

10. The method for mimicking self-similar traffic in a telecommunications network of claim 1, wherein the self-similarity parameters include an average arrival time and a fractal onset time.

11. The method for mimicking self-similar traffic in a telecommunications network of claim 10 wherein the values of the average arrival time and the fractal onset time are used for retrieving the distributed sequences from the table in conjunction with the Hurst parameter.

12. The method for mimicking self-similar traffic in a telecommunications network of claim 1 further comprising generating the selected streams from the self-similar traffic distribution.

13. The method for mimicking self-similar traffic in a telecommunications network of claim 12 further comprising applying the generated streams of self-similar traffic to a portion of a telecommunications network.

14. The method for mimicking self-similar traffic in a telecommunications network of claim 13 further comprising simulating a behavior of the portion of the telecommunications network based on the applied streams of self-similar traffic.

15. A method for mimicking self-similar traffic in a telecommunications network, the method comprising
providing values for at least one self-similarity parameter for plural streams, the self-similarity parameters including a Hurst parameter
selecting at least one of the streams
generating a self-similar traffic distribution for the selected streams based on the values of the self similarity parameters for the selected streams, wherein the self-similar traffic distribution is further based upon distributed sequences retrieved from a memory based upon the value of the Hurst parameter for the selected streams
wherein the memory stores distributed sequences for self-similar traffic correlated to a range of values for the Hurst parameter
wherein the distributed sequences are described by a formula having a shape parameter and a minimum value for the respective distributed sequence and a uniformly distributed random variable
wherein the value for the shape parameter is fixed and the minimum value for the distributed sequences is fixed
wherein the memory stores logarithms of values of the uniformly distributed random variable.

16. The method for mimicking self-similar traffic in a telecommunications network of claim 15, wherein the distributed sequences are Pareto-distributed sequences.

17. The method for mimicking self-similar traffic in a telecommunications network of claim 15, wherein the distributed sequences are truncated-value Pareto distributions.

18. The method for mimicking self-similar traffic in a telecommunications network of claim 15, wherein the distributed sequences comprise competing flows.

19. The method for mimicking self-similar traffic in a telecommunications network of claim 18 wherein the distributed sequences each comprise a single ON/OFF process.

20. The method for mimicking self-similar traffic in a telecommunications network of claim 15, wherein the traffic distribution comprises a series of ON and OFF periods.

21. The method for mimicking self-similar traffic in a telecommunications network of claim 20, wherein only one of the ON and OFF periods has a heavy-tailed distribution.

22. The method for mimicking self-similar traffic in a telecommunications network of claim 21, wherein the heavy-tailed distribution is a Pareto distribution.

23. The method for mimicking self-similar traffic in a telecommunications network of claim 15 wherein the distributed sequences comprise superposition of plural independent and probabilistically identical fractal renewal processes.

24. The method for mimicking self-similar traffic in a telecommunications network of claim 15, wherein the self-similarity parameters include an average arrival time and a fractal onset time.

25. The method for mimicking self-similar traffic in a telecommunications network of claim 24 wherein the values of the average arrival time and the fractal onset time are used for retrieving the distributed sequences from the memory in conjunction with the Hurst parameter.

26. The method for mimicking self-similar traffic in a telecommunications network of claim 15 further comprising generating the selected streams from the self-similar traffic distribution.

27. The method for mimicking self-similar traffic in a telecommunications network of claim 26 further comprising applying the generated streams of self-similar traffic to a portion of a telecommunications network.

28. The method for mimicking self-similar traffic in a telecommunications network of claim 27 further comprising simulating a behavior of the portion of the telecommunications network based on the applied streams of self-similar traffic.

29. A method for mimicking self-similar traffic in a telecommunications network, the method comprising
providing values for at least one self-similarity parameter for plural streams, the self-similarity parameters including a Hurst parameter
selecting at least one of the streams
generating self-similar traffic distributions for the selected streams based the values of on the self similarity parameters for the selected streams, wherein
the self-similar traffic distribution is based upon distributed sequences described by a formula having a shape parameter, a minimum value for the respective distributed sequences and a uniformly distributed random variable
the shape parameter has a fixed value
the minimum value for the distributed sequences is fixed
the distributed sequences are obtained from logarithms of values of the uniformly distributed random variable.

30. The method for mimicking self-similar traffic in a telecommunications network of claim 29 further comprising
pre-storing the logarithms of values of the uniformly distributed random variable in a memory
in the generating step, obtaining the logarithms from the memory.

31. The method for mimicking self-similar traffic in a telecommunications network of claim 29 further comprising
pre-storing the distributed sequences in a memory
in the generating step, obtaining the distributed sequences from the memory.

32. The method for mimicking self-similar traffic in a telecommunications network of claim 29, wherein the distributed sequences are Pareto-distributed sequences.

33. The method for mimicking self-similar traffic in a telecommunications network of claim 29, wherein the distributed sequences are truncated-value Pareto distributions.

34. The method for mimicking self-similar traffic in a telecommunications network of claim 29, wherein the distributed sequences comprise competing flows.

35. The method for mimicking self-similar traffic in a telecommunications network of claim 34 wherein the distributed sequences each comprise a single ON/OFF process.

36. The method for mimicking self-similar traffic in a telecommunications network of claim 29, wherein the traffic distribution comprises a series of ON and OFF periods.

37. The method for mimicking self-similar traffic in a telecommunications network of claim 36, wherein only one of the ON and OFF periods has a heavy-tailed distribution.

38. The method for mimicking self-similar traffic in a telecommunications network of claim 37, wherein the heavy-tailed distribution is a Pareto distribution.

39. The method for mimicking self-similar traffic in a telecommunications network of claim 29 wherein the distributed sequences comprise superposition of plural independent and probabilistically identical fractal renewal processes.

40. The method for mimicking self-similar traffic in a telecommunications network of claim 29, wherein the self-similarity parameters include an average arrival time and a fractal onset time.

41. The method for mimicking self-similar traffic in a telecommunications network of claim 40 wherein the values of the average arrival time and the fractal onset time are used for retrieving the distributed sequences from the memory in conjunction with the Hurst parameter.

42. The method for mimicking self-similar traffic in a telecommunications network of claim 29 further comprising generating the selected streams from the self-similar traffic distribution.

43. The method for mimicking self-similar traffic in a telecommunications network of claim 42 further comprising applying the generated streams of self-similar traffic to a portion of a telecommunications network.

44. The method for mimicking self-similar traffic in a telecommunications network of claim 43 further comprising simulating a behavior of the portion of the telecommunications network based on the applied streams of self-similar traffic.

45. An apparatus for mimicking self-similar traffic in a telecommunications network, the apparatus comprising
a buffer to receive values for at least one self-similarity parameter for plural streams, the self-similarity parameters including a Hurst parameter
an arbitrator coupled to the buffer to select at least one of the streams
a memory storing a table of distributed sequences for self-similar traffic
a distribution calculator coupled to the memory, the distribution calculator to generate a self-similar traffic distribution for the selected streams based on the values of the self similarity parameters for the selected streams
wherein the self-similar traffic distribution is further based upon distributed sequences retrieved from the table based upon the value of the Hurst parameter for the selected streams
wherein the distributed sequences are described by a formula having a shape parameter and a minimum value for the respective distributed sequence and a uniformly distributed random variable wherein the value for the shape parameter is fixed and the minimum value for the distributed sequences is fixed wherein the table comprises logarithms of values of the uniformly distributed random variable a scheduler coupled to the distribution calculator to schedule transmission of data units for the selected streams.

46. The apparatus for mimicking self-similar traffic in a telecommunications network of claim 45, wherein the distributed sequences are Pareto-distributed sequences.

47. The apparatus for mimicking self-similar traffic in a telecommunications network of claim 45, wherein the distributed sequences are truncated-value Pareto distributions.

48. The apparatus for mimicking self-similar traffic in a telecommunications network of claim 45, wherein the distributed sequences comprise competing flows.

49. The apparatus for mimicking self-similar traffic in a telecommunications network of claim 48 wherein the distributed sequences each comprise a single ON/OFF process.

50. The apparatus for mimicking self-similar traffic in a telecommunications network of claim 45, wherein the traffic distribution comprises a series of ON and OFF periods.

51. The apparatus for mimicking self-similar traffic in a telecommunications network of claim 50, wherein only one of the ON and OFF periods has a heavy-tailed distribution.

52. The apparatus for mimicking self-similar traffic in a telecommunications network of claim 51, wherein the heavy-tailed distribution is a Pareto distribution.

53. The apparatus for mimicking self-similar traffic in a telecommunications network of claim 45 wherein the distributed sequences comprise superposition of plural independent and probabilistically identical fractal renewal processes.

54. The apparatus for mimicking self-similar traffic in a telecommunications network of claim 45, wherein the self-similarity parameters include an average arrival time and a fractal onset time.

55. The apparatus for mimicking self-similar traffic in a telecommunications network of claim 54 wherein the values of the average arrival time and the fractal onset time are used for retrieving the distributed sequences from the table in conjunction with the Hurst parameter.

56. The apparatus for mimicking self-similar traffic in a telecommunications network of claim 45 further comprising a blaster unit to generate the selected streams from the self-similar traffic distribution.

57. The apparatus for mimicking self-similar traffic in a telecommunications network of claim 56 wherein the blaster unit includes the scheduler.

58. The apparatus for mimicking self-similar traffic in a telecommunications network of claim 56 further comprising a transmit engine to apply the generated streams of self-similar traffic to a portion of a telecommunications network.

59. A network card comprising the apparatus of claim 45.

60. A traffic generator comprising the apparatus of claim 45.

61. An apparatus for mimicking self-similar traffic in a telecommunications network, the apparatus comprising a buffer to receive values for at least one self-similarity parameter for plural streams, the self-similarity parameters including a Hurst parameter an arbitrator coupled to the buffer to select at least one of the streams a memory storing distributed sequences for self-similar traffic correlated to a range of values for the Hurst parameter a distribution calculator coupled to the memory, the distribution calculator to generate a self-similar traffic distribution for the selected streams based on the values of the self similarity parameters for the selected streams wherein the self-similar traffic distribution is further based upon distributed sequences retrieved from the memory based upon the value of the Hurst parameter for the selected streams wherein the distributed sequences are described by a formula having a shape parameter and a minimum value for the respective distributed sequence and a uniformly distributed random variable wherein the value for the shape parameter is fixed and the minimum value for the distributed sequences is fixed wherein the memory stores logarithms of values of the uniformly distributed random variable a scheduler coupled to the distribution calculator to schedule transmission of data units for the selected streams.

62. The apparatus for mimicking self-similar traffic in a telecommunications network of claim 61, wherein the distributed sequences are Pareto-distributed sequences.

63. The apparatus for mimicking self-similar traffic in a telecommunications network of claim 61, wherein the distributed sequences are truncated-value Pareto distributions.

64. The apparatus for mimicking self-similar traffic in a telecommunications network of claim 61, wherein the distributed sequences comprise competing flows.

65. The apparatus for mimicking self-similar traffic in a telecommunications network of claim 61 wherein the distributed sequences each comprise a single ON/OFF process.

66. The apparatus for mimicking self-similar traffic in a telecommunications network of claim 61, wherein the traffic distribution comprises a series of ON and OFF periods.

67. The apparatus for mimicking self-similar traffic in a telecommunications network of claim 66, wherein only one of the ON and OFF periods has a heavy-tailed distribution.

68. The apparatus for mimicking self-similar traffic in a telecommunications network of claim 67, wherein the heavy-tailed distribution is a Pareto distribution.

69. The apparatus for mimicking self-similar traffic in a telecommunications network of claim 61 wherein the distributed sequences comprise superposition of plural independent and probabilistically identical fractal renewal processes.

70. The apparatus for mimicking self-similar traffic in a telecommunications network of claim 61, wherein the self-similarity parameters include an average arrival time and a fractal onset time.

71. The apparatus for mimicking self-similar traffic in a telecommunications network of claim 70 wherein the values of the average arrival time and the fractal onset time are used for retrieving the distributed sequences from the memory in conjunction with the Hurst parameter.

72. The apparatus for mimicking self-similar traffic in a telecommunications network of claim 61 further comprising a blaster unit to generate the selected streams from the self-similar traffic distribution.

73. The apparatus for mimicking self-similar traffic in a telecommunications network of claim 72 wherein the blaster unit includes the scheduler.

74. The apparatus for mimicking self-similar traffic in a telecommunications network of claim 72 further comprising a transmit engine to apply the generated streams of self-similar traffic to a portion of a telecommunications network.

75. A network card comprising the apparatus of claim 61.

76. A traffic generator comprising the apparatus of claim 61.

77. An apparatus for mimicking self-similar traffic in a telecommunications network, the apparatus comprising
a buffer to receive values for at least one self-similarity parameter for plural streams, the self-similarity parameters including a Hurst parameter
an arbitrator coupled to the buffer to select at least one of the streams
a memory storing distributed sequences for self-similar traffic correlated to a range of values for the Hurst parameter
a distribution calculator coupled to the memory, the distribution calculator to generate self-similar traffic distributions for the selected streams based on the values of the self similarity parameters for the selected streams, wherein
the self-similar traffic distribution is based upon distributed sequences described by a formula having a shape parameter, a minimum value for the respective distributed sequences and a uniformly distributed random variable
the shape parameter has a fixed value
the minimum value for the distributed sequences is fixed
the distributed sequences are obtained from logarithms of values of the uniformly distributed random variable
a scheduler coupled to the distribution calculator to schedule transmission of data units for the selected streams.

78. The apparatus of claim 77 wherein the memory stores the logarithms of values of the uniformly distributed random variable, and the distribution calculator obtains the logarithms from the memory.

79. The apparatus of claim 77 wherein the memory stores the distributed sequences, and the distribution calculator obtains the distributed sequences from the memory.

80. The apparatus for mimicking self-similar traffic in a telecommunications network of claim 77, wherein the distributed sequences are Pareto-distributed sequences.

81. The apparatus for mimicking self-similar traffic in a telecommunications network of claim 77, wherein the distributed sequences are truncated-value Pareto distributions.

82. The apparatus for mimicking self-similar traffic in a telecommunications network of claim 77, wherein the distributed sequences comprise competing flows.

83. The apparatus for mimicking self-similar traffic in a telecommunications network of claim 82 wherein the distributed sequences each comprise a single ON/OFF process.

84. The apparatus for mimicking self-similar traffic in a telecommunications network of claim 77, wherein the traffic distribution comprises a series of ON and OFF periods.

85. The apparatus for mimicking self-similar traffic in a telecommunications network of claim 84, wherein only one of the ON and OFF periods has a heavy-tailed distribution.

86. The apparatus for mimicking self-similar traffic in a telecommunications network of claim 85, wherein the heavy-tailed distribution is a Pareto distribution.

87. The apparatus for mimicking self-similar traffic in a telecommunications network of claim 77 wherein the distributed sequences comprise superposition of plural independent and probabilistically identical fractal renewal processes.

88. The apparatus for mimicking self-similar traffic in a telecommunications network of claim 77, wherein the self-similarity parameters include an average arrival time and a fractal onset time.

89. The apparatus for mimicking self-similar traffic in a telecommunications network of claim 88 wherein the values of the average arrival time and the fractal onset time are used for retrieving the distributed sequences from the memory in conjunction with the Hurst parameter.

90. The apparatus for mimicking self-similar traffic in a telecommunications network of claim 77 further comprising a blaster unit to generate the selected streams from the self-similar traffic distribution.

91. The apparatus for mimicking self-similar traffic in a telecommunications network of claim 90 wherein the blaster unit includes the scheduler.

92. The apparatus for mimicking self-similar traffic in a telecommunications network of claim 90 further comprising a transmit engine to apply the generated streams of self-similar traffic to a portion of a telecommunications network.

93. A network card comprising the apparatus of claim 77.

94. A traffic generator comprising the apparatus of claim 77.

95. A computer-readable medium having computer readable program code embodied therein for mimicking self-similar traffic in a telecommunications network, the computer readable code which when executed by a computer causing the computer to perform:
receive values for at least one self-similarity parameter for plural streams, the self-similarity parameters including a Hurst parameter
select at least one of the streams
generate a self-similar traffic distribution for the selected streams based on the values of the self similarity parameters for the selected streams
wherein the self-similar traffic distribution is further based upon distributed sequences retrieved from a table based upon the value of the Hurst parameter for the selected streams
wherein the table stores distributed sequences for self-similar traffic
wherein the distributed sequences are described by a formula having a shape parameter and a minimum value for the respective distributed sequence and a uniformly distributed random variable
wherein the value for the shape parameter is fixed and the minimum value for the distributed sequences is fixed
wherein the table comprises logarithms of values of the uniformly distributed random variable.

96. The computer-readable medium of claim 95, wherein the distributed sequences are Pareto-distributed sequences.

97. The computer-readable medium of claim 95, wherein the distributed sequences are truncated-value Pareto distributions.

98. The computer-readable medium of claim 95, wherein the distributed sequences comprise competing flows.

99. The computer-readable medium of claim 98 wherein the distributed sequences each comprise a single ON/OFF process.

100. The computer-readable medium of claim 95, wherein the traffic distribution comprises a series of ON and OFF periods.

101. The computer-readable medium of claim 100, wherein only one of the ON and OFF periods has a heavy-tailed distribution.

102. The computer-readable medium of claim 101, wherein the heavy-tailed distribution is a Pareto distribution.

103. The computer-readable medium of claim 95 wherein the distributed sequences comprise superposition of plural independent and probabilistically identical fractal renewal processes.

104. The computer-readable medium of claim 95, wherein the self-similarity parameters include an average arrival time and a fractal onset time.

105. The computer-readable medium of claim 104, the computer readable code for causing a processor to use the values of the average arrival time and the fractal onset time to retrieve the distributed sequences from the table in conjunction with the Hurst parameter.

106. A computer-readable medium having computer readable program code embodied therein for mimicking self-similar traffic in a telecommunications network, the computer readable code which when executed by a computer causing the computer to perform:
receive values for at least one self-similarity parameter for plural streams, the self-similarity parameters including a Hurst parameter
select at least one of the streams
generate a self-similar traffic distribution for the selected streams based on the values of the self similarity parameters for the selected streams
wherein the self-similar traffic distribution is further based upon distributed sequences retrieved from a memory based upon the value of the Hurst parameter for the selected streams
wherein the memory stores distributed sequences for self-similar traffic correlated to a range of values for the Hurst parameter
wherein the distributed sequences are described by a formula having a shape parameter and a minimum value for the respective distributed sequence and a uniformly distributed random variable
wherein the value for the shape parameter is fixed and the minimum value for the distributed sequences is fixed
wherein the memory stores logarithms of values of the uniformly distributed random variable.

107. The computer-readable medium of claim 106, wherein the distributed sequences are Pareto-distributed sequences.

108. The computer-readable medium of claim 106, wherein the distributed sequences are truncated-value Pareto distributions.

109. The computer-readable medium of claim 106, wherein the distributed sequences comprise competing flows.

110. The computer-readable medium of claim 106 wherein the distributed sequences each comprise a single ON/OFF process.

111. The computer-readable medium of claim 106, wherein the traffic distribution comprises a series of ON and OFF periods.

112. The computer-readable medium of claim 111, wherein only one of the ON and OFF periods has a heavy-tailed distribution.

113. The computer-readable medium of claim 112, wherein the heavy-tailed distribution is a Pareto distribution.

114. The computer-readable medium of claim 106 wherein the distributed sequences comprise superposition of plural independent and probabilistically identical fractal renewal processes.

115. The computer-readable medium of claim 106, wherein the self-similarity parameters include an average arrival time and a fractal onset time.

116. The computer-readable medium of claim 115 wherein the values of the average arrival time and the fractal onset time are used for retrieving the distributed sequences from the memory in conjunction with the Hurst parameter.

117. A computer-readable medium having computer readable program code embodied therein for mimicking self-similar traffic in a telecommunications network, the computer readable code which when executed by a computer causing the computer to perform:
receive values for at least one self-similarity parameter for plural streams, the self-similarity parameters including a Hurst parameter
select at least one of the streams
generate self-similar traffic distributions for the selected streams based on the values of the self similarity parameters for the selected streams, wherein
the self-similar traffic distribution is based upon distributed sequences described by a formula having a shape parameter, a minimum value for the respective distributed sequences and a uniformly distributed random variable
the shape parameter has a fixed value
the minimum value for the distributed sequences is fixed
the distributed sequences are obtained from logarithms of values of the uniformly distributed random variable.

118. The computer-readable medium of claim 117 further comprising
pre-storing the logarithms of values of the uniformly distributed random variable in a memory
in the generating step, obtaining the logarithms from the memory.

119. The computer-readable medium of claim 117 further comprising
pre-storing the distributed sequences in a memory
in the generating step, obtaining the distributed sequences from the memory.

120. The computer-readable medium of claim 117, wherein the distributed sequences are Pareto-distributed sequences.

121. The computer-readable medium of claim 117, wherein the distributed sequences are truncated-value Pareto distributions.

122. The computer-readable medium of claim 117, wherein the distributed sequences comprise competing flows.

123. The computer-readable medium of claim 122 wherein the distributed sequences each comprise a single ON/OFF process.

124. The computer-readable medium of claim 117, wherein the traffic distribution comprises a series of ON and OFF periods.

125. The computer-readable medium of claim 124, wherein only one of the ON and OFF periods has a heavy-tailed distribution.

126. The computer-readable medium of claim 125, wherein the heavy-tailed distribution is a Pareto distribution.

127. The computer-readable medium of claim 117 wherein the distributed sequences comprise superposition of plural independent and probabilistically identical fractal renewal processes.

128. The computer-readable medium of claim 117, wherein the self-similarity parameters include an average arrival time and a fractal onset time.

129. The computer-readable medium of claim 128, the computer readable code for causing a processor to use the values of the average arrival time and the fractal onset time to retrieve the distributed sequences from the memory in conjunction with the Hurst parameter.

* * * * *